United States Patent
Feng et al.

(10) Patent No.: US 10,969,971 B2
(45) Date of Patent: Apr. 6, 2021

(54) DATA STORAGE METHOD AND APPARATUS

(71) Applicant: BEIJING BAIDU NETCOM SCIENCE AND TECHNOLOGY CO., LTD., Beijing (CN)

(72) Inventors: Jingchao Feng, Beijing (CN); Liming Xia, Beijing (CN); Quan Wang, Beijing (CN); Ming Qu, Beijing (CN); Zhuo Chen, Beijing (CN); Yu Ma, Beijing (CN); Haifeng Wang, Beijing (CN); Yibing Liang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 552 days.

(21) Appl. No.: 15/410,953

(22) Filed: Jan. 20, 2017

(65) Prior Publication Data
US 2018/0074729 A1  Mar. 15, 2018

(30) Foreign Application Priority Data
Sep. 14, 2016 (CN) .......................... 201610827136.9

(51) Int. Cl.
G06F 3/06 (2006.01)

(52) U.S. Cl.
CPC ............ *G06F 3/0619* (2013.01); *G06F 3/065* (2013.01); *G06F 3/067* (2013.01); *G06F 3/0631* (2013.01)

(58) Field of Classification Search
CPC ......... G06F 3/0604–0626; G06F 3/0638–0644
See application file for complete search history.

(56) References Cited

U.S. PATENT DOCUMENTS

| | | | | |
|---|---|---|---|---|
| 6,691,209 B1 * | 2/2004 | O'Connell | ............ | G06F 3/0604 700/200 |
| 7,921,363 B1 * | 4/2011 | Hao | ..................... | G06T 11/206 345/428 |
| 2005/0144361 A1 * | 6/2005 | Gonzalez | ............ | G06F 12/0246 711/103 |

(Continued)

FOREIGN PATENT DOCUMENTS

| CN | 103678160 A | 3/2014 |
|---|---|---|
| CN | 104360865 A | 2/2015 |

OTHER PUBLICATIONS

Chinese Office Action for Chinese Priority Application No. 201610827136.9; Office Action dated Aug. 21, 2018.

*Primary Examiner* — Nicholas J Simonetti
(74) *Attorney, Agent, or Firm* — von Briesen & Roper, s.c.

(57) ABSTRACT

The present application discloses a data storage method and apparatus. A specific implementation of the method includes: acquiring to-be-serialized data and a description file related to the to-be-serialized data, wherein the to-be-serialized data includes a data name and a data value, and the description file includes a file identifier and at least one data element, the data element includes at least one data item, and the data item includes a data item name and a data type; allocating a memory space to the data item according to the data type; finding, according to a preset matching relationship between the to-be-serialized data and the data item, a data item matched with the to-be-serialized data; and storing the data value into the memory space of the found data item as a data item value of the found data item. This implementation improves the data storage efficiency.

12 Claims, 5 Drawing Sheets

(56) References Cited

U.S. PATENT DOCUMENTS

2009/0228507 A1* 9/2009 Jain .................... G06F 17/2705
2011/0264924 A1* 10/2011 Koifman ............... G06F 3/0623
                                                        713/189
2014/0156632 A1* 6/2014 Yu ..................... G06F 16/24545
                                                        707/713

* cited by examiner

DATA STORAGE METHOD AND APPARATUS

CROSS-REFERENCE TO RELATED APPLICATION

This application is related to and claims priority from Chinese Application No. 201610827136.9, filed on Sep. 14, 2016, the entire disclosure of which is hereby incorporated by reference.

TECHNICAL FIELD

The present application relates to the field of computer technologies, particularly to the field of computer application technologies, and more particularly to a data storage method and a data storage apparatus.

BACKGROUND

Data storage is a technology of serializing and storing raw data. Subsequent operations may be performed on the stored data, for example, the stored data may be transmitted, or added, deleted, modified or searched. The mode in which the data is stored directly affects the data storage efficiency.

However, conventional data storage methods are generally based on key values, and a large number of key values need to be set in order to distinguish different data. Consequently, the data is scattered, leading to the problem of low data storage efficiency.

SUMMARY

An objective of the present application is to provide an improved data storage method and an improved data storage apparatus, so as to solve the technical problem mentioned in the Background.

According to a first aspect, the present application provides a data storage method, comprising: acquiring to-be-serialized data and a description file related to the to-be-serialized data, wherein the to-be-serialized data comprises a data name and a data value, and the description file comprises a file identifier and at least one data element, the data element comprises at least one data item, and the data item comprises a data item name and a data type; allocating a memory space to the data item according to the data type; finding, according to a preset matching relationship between the to-be-serialized data and the data item, a data item matched with the data name; and storing the data value into the memory space of the found data item as a data item value of the found data item.

In some embodiments, the allocating a memory space to the data item according to the data type comprises: generating a storage address according to a file identifier of a file to which the data item belongs, a data element identifier of a data element to which the data item belongs, and the data item name, wherein the storage address points to the memory space allocated to the data item.

In some embodiments, the storing the data value into the memory space of the found data item as a data item value of the found data item comprises: determining whether a type of the data value is consistent with the data type of the found data item; determining whether the data value falls within a predetermined data range of the data item value of the found data item, in response to a the type of the data value being consistent with the data type of the found data item; and storing the data value into the memory space of the found data item as the data item value in response to the data value falling within the data range.

In some embodiments, after the data value is stored into the memory space of the found data item as a data item value of the found data item, the method further comprises: encrypting the data item value; and transmitting the encrypted data item value.

In some embodiments, the method further comprises: setting a reading mode identifier for the data item, the reading mode identifier comprising a mandatory reading identifier or an optional reading identifier, and the reading mode being used for indicating a mode in which a process that receives the transmitted data item value reads the transmitted data item value; and the allocating a memory space to the data item according to the data type further comprises: allocating the memory space to the data item according to the data type and the reading mode identifier.

According to a second aspect, the present application provides a data storage apparatus, comprising: an acquiring unit configured to acquire to-be-serialized data and a description file related to the to-be-serialized data, wherein the to-be-serialized data comprises a data name and a data value, and the description file comprises a file identifier and at least one data element, the data element comprises at least one data item, and the data item comprises a data item name and a data type; an allocation unit configured to allocate a memory space to the data item according to the data type; a search unit configured to find, according to a preset matching relationship between the to-be-serialized data and the data item, a data item matched with the data name; and a storage unit configured to store the data value into the memory space of the found data item as a data item value of the found data item.

In some embodiments, the allocation unit is further configured to: generate a storage address according to a file identifier of a file to which the data item belongs, a data element identifier of a data element to which the data item belongs, and the data item name, the storage address pointing to the memory space allocated to the data item.

In some embodiments, the search unit is further configured to: determine whether a type of the data value is consistent with the data type of the found data item; determine whether the data value falls within a predetermined data range of the data item value of the found data item, in response to the type of the data value being consistent with the data type of the found data item; and store the data value into the memory space of the found data item as the data item value in response to the data value falling within the data range.

In some embodiments, the apparatus further comprises: an encryption unit configured to encrypt the data item value; and a transmission unit configured to transmit the encrypted data item value.

In some embodiments, the apparatus further comprises: a setting unit configured to set a reading mode identifier for the data item, the reading mode identifier comprising a mandatory reading identifier or an optional reading identifier, and the reading mode being used for indicating a mode in which a process that receives the transmitted data item value reads the transmitted data item value; and the allocation unit is further configured to: allocate the memory space to the data item according to the data type and the reading mode identifier.

According to the data storage method and apparatus provided by the present application, one or more data elements are set in the description file, and one or more data items are set in the data element, so that the levels of data storage are increased; a storage space is allocated to the data item according to the data type; a data item matched with the to-be-serialized data is found according to a preset matching relationship between the to-be-serialized data and the data item; the above-mentioned data value is stored into the storage space of the found data item as a data item value of the found data item. Thereby, the data storage efficiency is improved.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
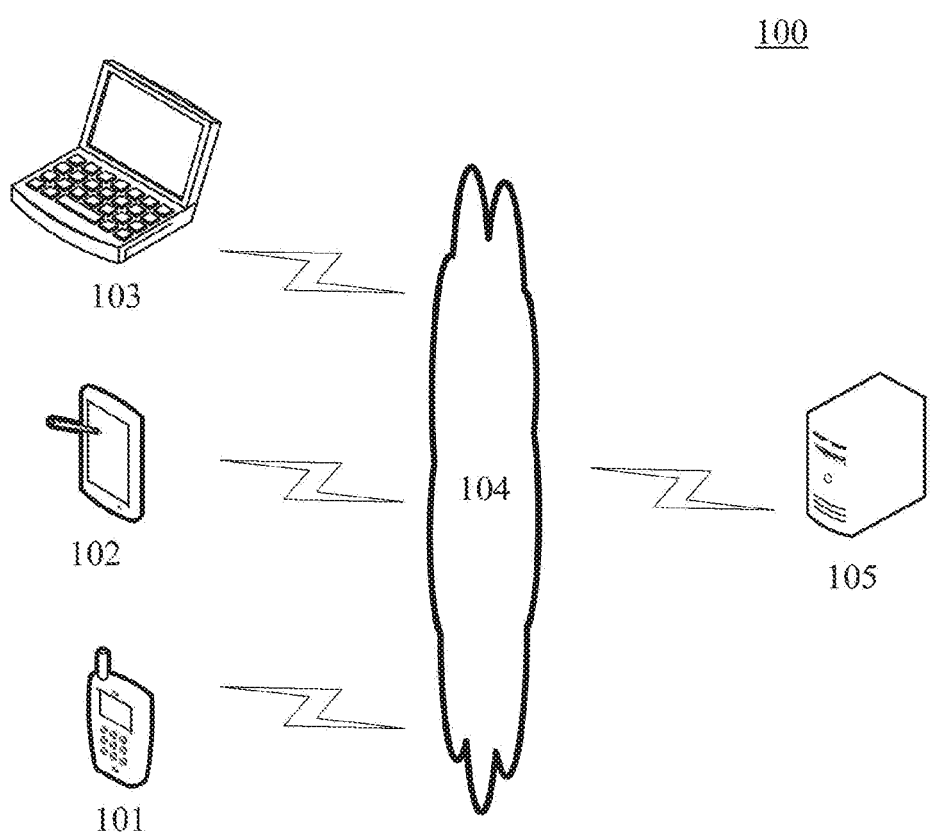
FIG. 1 is a diagram illustrating an exemplary system architecture to which the present application can be applied.

FIG. 1 shows an exemplary architecture of a system 100 to which a data storage method or a data storage apparatus according to an embodiment of the present application is applicable.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless communication links, or optical fibers.

The user may use the terminal devices 101, 102 and 103 to interact with the server 105 through the network 104, in order to transmit or receive messages, etc. The terminal devices 101, 102, and 103 may be installed with various communication client applications, such as, instant messaging tools, webpage browser applications, shopping applications, search applications, mail clients, and social networking software.

The terminal devices 101, 102, and 103 may be any electronic devices having a display and capable of browsing webpage, including but not limited to, a smart phone, a tablet computer, an e-book reader, a Moving Picture Experts Group Audio Layer III (MP3) player, a Moving Picture Experts Group Audio Layer IV (MP4) player, a laptop portable computer, a desktop computer, and the like.

The server 105 may be a server providing various services, for example, a background server for supporting the instant messaging on the terminal devices 101, 102, and 103. The background server may perform processing, such as serializing and storing, on the received data of the instant messaging.

It should be noted that the data storage method according to the embodiments of the present application may be executed by the server 105. Accordingly, the data storage apparatus may be set in the server 105.

It should be appreciated that the numbers of the terminal devices, the networks and the servers in FIG. 1 are merely illustrative. Any number of terminal devices, networks and servers may be provided based on the actual requirements. In addition, it should be noted that the terminal devices and the servers are merely examples of electronic devices capable of processing data. It should be appreciated that the terminal devices may be any other electronic devices capable of transmitting data, and the servers may be any other electronic devices capable of receiving and storing data.

Figure 2:
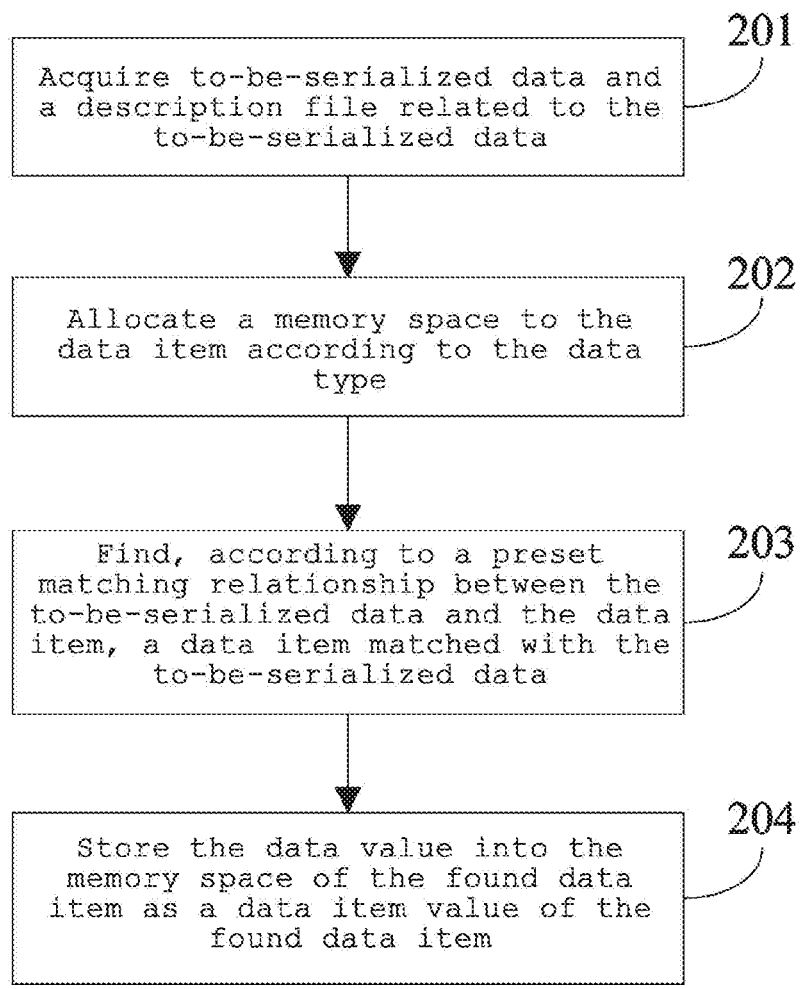
FIG. 2 is a flow chart of a data storage method according to an embodiment of the present application.

Further referring to FIG. 2, FIG. 2 shows a flow 200 of a data storage method according to an embodiment of the present application. The above-mentioned data storage method includes the following steps:

Step 201: to-be-serialized data and a description file related to the data is acquired.

In this embodiment, an electronic device (for example, the server shown in FIG. 1) on which the data storage method runs may acquire the to-be-serialized data from a terminal device or locally from the above-mentioned electronic device, and acquire, locally from the above-mentioned electronic device, a description file related to the to-be-serialized data. Herein, the to-be-serialized data includes a data name and a data value.

In this embodiment, the above-mentioned to-be-serialized data may be raw data received by the above-mentioned electronic device from the terminal device. Alternatively, the above-mentioned to-be-serialized data may be raw data stored in advance in the above-mentioned electronic device. Different devices may store data in different formats. There is a possibility that the raw data received from the terminal device cannot be directly stored in the above-mentioned electronic device. Therefore, the raw data needs to be serialized first, and then the serialized raw data is stored. Herein, the raw data that needs to be serialized is the to-be-serialized data. When two processes perform remote communication, they may send various types of data to each other. Any type of data is stored or transferred over a network in the form of a binary sequence. The sending party needs to convert this object into a byte sequence before storing or transferring it over the network; the receiving party needs to recover the object from the byte sequence. The process of converting an object into a byte sequence is referred to as serialization of the object. The process of recovering the object from the byte sequence is referred to as deserialization of the object.

As an example, the terminal device sends, to the server, registration information that is submitted by two users using different terminal devices, and in order to store the registration information of the two users, the server needs to serialize data in the two pieces of registration information and then store the data to a storage location corresponding to the two users.

In this embodiment, the above-mentioned description file includes a file identifier and at least one data element. The data element is the basic unit of data. The data element may also be referred to as a node or record, and is usually considered and processed as a whole in a computer program. The data element includes at least one data item including a data name and a data type. One data element may consist of several data items. For example, bibliographic information of a book is a data element, and each item (for example, book name, author's name, etc.) of the bibliographic information is a data item. The data item is the smallest indivisible unit of data.

In this embodiment, the above-mentioned description file refers to a description file created according to the to-be-serialized data. The description file created according to the to-be-serialized data may be created in advance. After being created, the description file may be stored in advance. When the to-be-serialized data is acquired, subsequent operations are performed on the to-be-serialized data by using the description file related to the acquired to-be-serialized data. As an example, working personnel may learn that data of three cameras needs to be sent to the above-mentioned electronic device, and the data of the three cameras includes collection time points of the cameras and image data collected by the cameras. In this case, a description file may be created according to the to-be-serialized data that is transmitted from the three cameras to the above-mentioned electronic device. The created description file may include a file identifier "data file of three cameras" and three data elements respectively corresponding to the three cameras, each data element including two data items, namely, a time data item and an image data item.

Step 202: a memory space is allocated to the data item according to the data type.

In this embodiment, the above-mentioned electronic device may allocate a memory space in a memory to the data item according to the data type.

In this embodiment, the above-mentioned data type may be integer, floating point, character, and so on. The amount of memory occupied by the data item value when the data item value of the data item is stored into a memory is determined by the data type. The above-mentioned memory space refers to a space in the memory.

In some optional implementations of this embodiment, when the memory space is allocated to the data item, a default initial data item value may be assigned to the data according to the data type.

In some optional implementations of this embodiment, a storage address may be generated according to a file identifier of a file to which the data item belongs, a data element identifier of a data element to which the data item belongs, and the data item name, the above-mentioned storage address pointing to the memory space allocated to the data item. When a modification operation is performed on the above-mentioned data item, a modification operation may be performed on the data item value in the memory space by using the file identifier, the data element identifier, the data item name, and the storage address.

Step 203: According to a preset matching relationship between the to-be-serialized data and the data items, it finds a data item matched with the to-be-serialized data.

In this embodiment, the above-mentioned electronic device may find, according to the preset matching relationship between the to-be-serialized data and the data items, the data item matched with the above-mentioned to-be-serialized data.

In some optional implementations of this embodiment, the above-mentioned matching relationship between the to-be-serialized data and the data items may be embodied in the form of a comparison table. The above-mentioned comparison table is used for representing the matching relationship between the to-be-serialized data and data items.

In some optional implementations of this embodiment, when there is a matching relationship between the data item and the to-be-serialized data, the data item name of the data item and the data name of the to-be-serialized data may be preset to a same name, so that the data item matched with the to-be-serialized data can be found by matching the data item name with the data name.

Step 204: the data value is stored into the memory space of the found data item as a data item value of the found data item.

In this embodiment, the above-mentioned electronic device may store, based on the data item found in step 203, the data value of the above-mentioned to-be-serialized data into the memory space of the found data item as the data item value of the found data item.

In some optional implementations of this embodiment, the above-mentioned electronic device may determine whether a type of the above-mentioned data value is consistent with a data type of the found data item; determine whether the above-mentioned data value falls within a predetermined data range of the data item value of the found data item, in response to the type of the above-mentioned data value being consistent with the data type of the found data item; and store the above-mentioned data value into the memory space of the found data item as the data item value in response to the above-mentioned data value falling within the above-mentioned data range.

As an example, if the data value of the to-be-serialized data is floating point-type data and the data type of the found data item is integer, it is indicated that the type of the above-mentioned data value is not consistent with the data type of the found data item, and the above-mentioned server may send an alarm for the above-mentioned to-be-serialized data.

As an example, if the data value of the to-be-serialized data is integer and the data type of the found data item is also integer, it is indicated that the type of the above-mentioned data value is consistent with the data type of the found data item, the above-mentioned electronic device may determine whether the data value of the to-be-serialized data falls within the predetermined data range of the data item value of the found data item. For example, if the data value of the to-be-serialized data is 200 and the predetermined data range of the data item value of the found data item is 0 to 100, it is determined that the data value of the to-be-serialized data does not fall within the predetermined data range of the data item value of the found data item, and the above-mentioned electronic device may send an overflow alarm for the data value of the to-be-serialized data. If the data value of the to-be-serialized data is 50, it is determined that the data value of the to-be-serialized data falls within the predetermined data range of the data item value of the found data item. If it is determined that the data value of the to-be-serialized data falls within the predetermined data range of the data item value of the found data item, the above-mentioned electronic device stores the above-mentioned data value into the memory space of the found data item as the data item value.

According to the method provided in the above-mentioned embodiment of the present application, one or more data elements are set in the description file, and one or more data items are set in the data element, so that the levels of data storage are increased. Moreover a storage space is allocated to the data item according to the data type, and a data item matched with the to-be-serialized data is found according to a preset matching relationship between the to-be-serialized data and the data item. The above-mentioned data value is then stored into the storage space of the found data item as a data item value of the found data item. Thereby, the data storage efficiency is improved.

Figure 3:
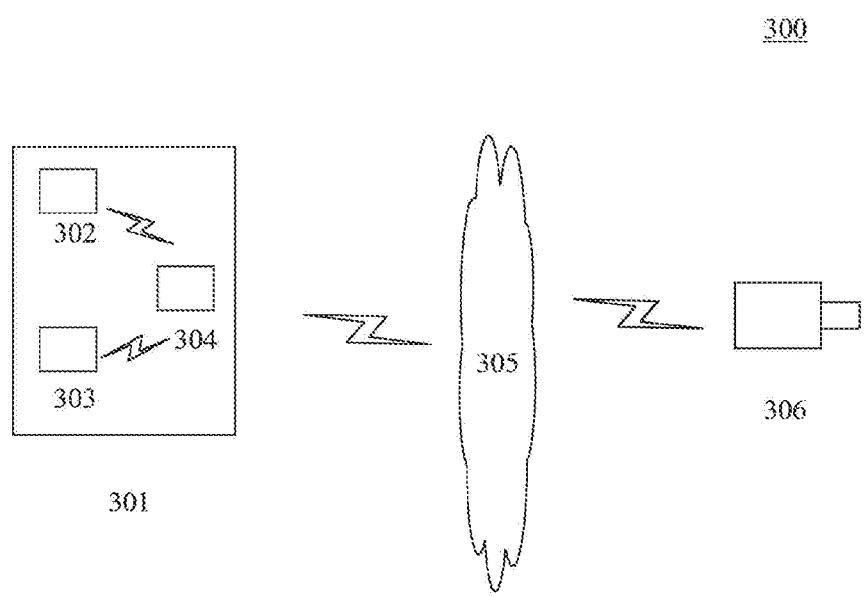
FIG. 3 is a diagram illustrating another exemplary system architecture to which the present application can be applied.
Figure 4:
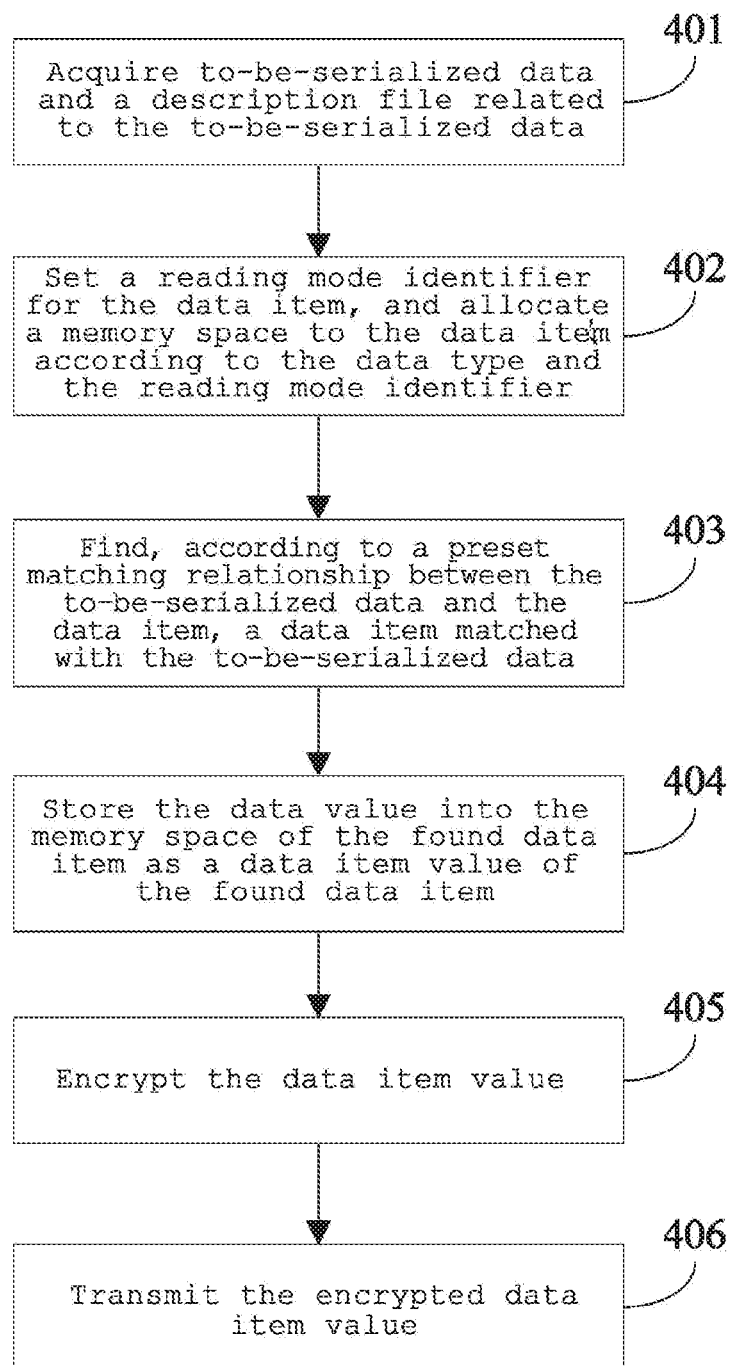
FIG. 4 is a flow chart of a data storage method according to another embodiment of the present application.

Further, referring to FIG. 3, FIG. 3 shows an exemplary system architecture 300 to which a data storage method according to an embodiment corresponding to FIG. 4 of the present application.

As shown in FIG. 3, the system architecture 300 may include a vehicle-mounted terminal 301, a collection device 306, and a network 305. The network 305 is a medium for providing communication links between the vehicle-mounted terminal 301 and the collection device 306. The network 305 may include various connection types, such as wired and wireless communication links or optical fiber cables.

The collection device 306 may be various electronic devices for collecting ambient environment information, including, but not limited to, a camera, a radar, a temperature sensor, a voice recording device, and so on.

An improved robot operating system may be installed on the vehicle-mounted terminal 301. The robot operating system may include a sending node 302, a receiving node 303 and a shared memory 304. Specifically, the robot operating system (ROS) may be formed by a large number of nodes and topics. Each node may be an independent process. There may be two types of nodes: sending nodes and receiving nodes. The sending node may be used for sending data that is collected, and the receiving node may be used for receiving data that is sent from the sending node (sometimes, a node may serve as both a sending node and a receiving node). A topic is a basis for establishing a connection between the nodes. After a connection is established between the nodes, the sending node and the receiving node may perform data transmission by means of a shared memory. In addition, data of different topics may be transmitted by using different shared memories.

The robot operating system on the vehicle-mounted terminal 301 stores data collected by the collection device 306 into the memory 304, thereby implementing the data transmission between the sending node 302 and the receiving node 303.

It should be noted that the data storage method provided in this embodiment of the present application is generally executed by the vehicle-mounted terminal 301. Correspondingly, a data storage apparatus is generally disposed in the vehicle-mounted terminal 301.

It should be appreciated that the number of vehicle-mounted terminals and the number of collection devices in FIG. 3 are merely exemplary. Any number of vehicle-mounted terminals and collection devices may be set according to implementation requirements.

Further, referring to FIG. 4, FIG. 4 shows a flow 400 of a data storage method according to another embodiment. The flow 400 of the data storage method includes the following steps:

Step 401: it acquires the to-be-serialized data and a description file related to the to-be-serialized data.

In this embodiment, an electronic device (for example, the vehicle-mounted terminal 301 shown in FIG. 3) on which the data storage method runs may acquire the to-be-serialized data from the collection device 306, and acquires, locally from the vehicle-mounted terminal, a description file related to the to-be-serialized data. Herein, the to-be-serialized data includes a data name and a data value. The above-mentioned description file includes a file identifier and at least one data element. The data element includes at least one data item, the data item including a data item name and a data type.

As an example, the to-be-serialized data may be data collected by the collection device, and before storing the data collected by the collection device, a central processing unit needs to serialize raw data that is in the original format of the collection device.

Step 402: a reading mode identifier for the data item is set, and a memory space is allocated to the data item according to the data type and the reading mode identifier.

In this embodiment, the electronic device (for example, the vehicle-mounted terminal 301 shown in FIG. 3) on which the data storage method runs may set a reading mode identifier for the data item first, and allocate a memory space in a memory to the data item according to the data type and the reading mode identifier. Herein, the reading mode identifier includes a mandatory reading identifier or an optional reading identifier.

As an example, if the mandatory reading identifier is set for a data item, a memory space allocated to the data item may be consecutive to a memory space of a previous data item for which the mandatory reading identifier is set; if the optional reading identifier is set for a data item, a memory space allocated to the data item may not be consecutive to the previously allocated memory space.

In this embodiment, the reading mode is used for indicating a mode in which a process that receives the transmitted data item value reads the transmitted data item value. As an example, when reading a data item with the mandatory reading identifier, the receiving node needs to read the data item value of the data item; when reading a data item with the optional reading identifier, the receiving node may determine whether to read the data item value, according to a file identifier of a file to which the data item belongs, a data element identifier of a data element to which the data item belongs, and the data item name of the data item.

In some optional implementations of this embodiment, an index may be generated according to a file identifier of a file to which the data item belongs, a data element identifier of a data element to which the data item belongs, and the data item name, wherein the above-mentioned index points to the memory space allocated to the data item.

Step 403: it finds, according to a preset matching relationship between the to-be-serialized data and the data item, a data item matched with the to-be-serialized data.

In this embodiment, the electronic device (for example, the vehicle-mounted terminal 301 shown in FIG. 3) on which the data storage method runs may find, according to a preset matching relationship between the to-be-serialized data and data items, a data item matched with the above-mentioned to-be-serialized data.

Step 404: the data value is stored into the memory space of the found data item as a data item value of the found data item.

In this embodiment, the electronic device (for example, the vehicle-mounted terminal 301 shown in FIG. 3) on which the data storage method runs may store the data value of the to-be-serialized data into the memory space of the found data item as the data item value of the found data item.

In some optional implementations of this embodiment, there may be a plurality of pieces of to-be-serialized data, and a description file may be associated with a plurality of pieces of to-be-serialized data. For example, the vehicle-mounted terminal may receive data of a plurality of collection devices, each collection device has a plurality of pieces of to-be-serialized data, and a plurality of pieces of to-be-serialized data of a plurality of collection devices is associated with a same description file. The vehicle-mounted terminal may traverse all the to-be-serialized data of all the collection devices, and implement the serialization and storage of the plurality of pieces of to-be-serialized data by using this description file.

Step 405: the data item value is encrypted.

In this embodiment, the electronic device (for example, the vehicle-mounted terminal 301 shown in FIG. 3) on which the data storage method runs may encrypt the data item value. It should be appreciated by those skilled in the art that the data item value may be encrypted by using an encryption algorithm such as Message-Digest Algorithm 5 (MD5). How to perform encryption using an encryption algorithm is well known to those skilled in the art, and will not be described in detail here.

In some optional implementations of this embodiment, after the serialization and storage of the plurality of pieces of to-be-serialized data are implemented by using this description file, a plurality of data item values is encrypted.

Step 406: the encrypted data item value is transmitted.

In this embodiment, the electronic device (for example, the vehicle-mounted terminal 301 shown in FIG. 3) on which the data storage method runs may transmit the encrypted data item value.

In some optional implementations of this embodiment, after the serialization and storage of the plurality of pieces of to-be-serialized data are implemented by using this description file, a plurality of data item values is encrypted, and then a plurality of encrypted data item values is transmitted.

As can be seen from FIG. 4, compared with the embodiment corresponding to FIG. 2, the flow 400 of the data storage method in this embodiment highlights the step of allocating a memory space to the data item according to the reading mode identifier and the step of encrypting and transmitting the data item value. Whereby, data storage and transmission can be implemented by using the solution provided by this embodiment, thereby implementing efficient data transmission between a sending node and a receiving node.

Figure 5:
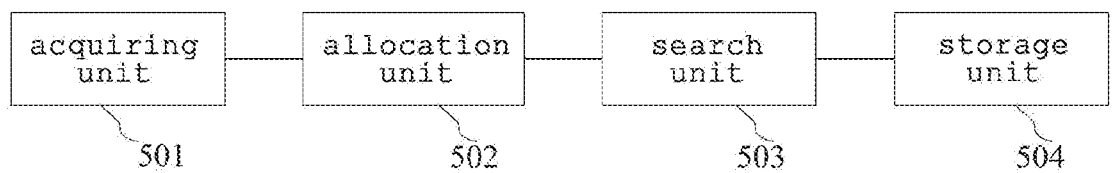
FIG. 5 is a schematic structural diagram of a data storage apparatus according to an embodiment of the present application.

Further, referring to FIG. 5, as an implementation of the methods shown in the above-mentioned figures, the present application provides an embodiment of a data storage apparatus. This apparatus embodiment corresponds to the method embodiment shown in FIG. 2. The apparatus may be specifically applied to various electronic devices.

As shown in FIG. 5, this embodiment the above-mentioned data storage apparatus 500 includes: an acquiring unit 501, an allocation unit 502, a search unit 503, and a storage unit 504. The acquiring unit 501 is configured to acquire the to-be-serialized data and the description file related to the to-be-serialized data, the to-be-serialized data including a data name and a data value, and the above-mentioned description file including a file identifier and at least one data element, the data element including at least one data item, and the data item including a data item name and a data type. The allocation unit 502 is configured to allocate a memory space to the data item according to the data type. The search unit 503 is configured to find, according to a preset matching relationship between the to-be-serialized data and data items, a data item matched with the above-mentioned data name. The storage unit 504 is configured to store the above-mentioned data value into the memory space of the found data item as a data item value of the found data item.

In this embodiment, the acquiring unit 501 in the data storage apparatus 500 may acquire the to-be-serialized data from a terminal device or locally from the above-mentioned electronic device, and acquire, locally from the above-mentioned electronic device, a description file related to the to-be-serialized data. Herein, the to-be-serialized data includes a data name and a data value.

In this embodiment, the allocation unit 502 in the data storage apparatus 500 may allocate a memory space in a memory to the data item according to the data type.

In this embodiment, the search unit 503 in the data storage apparatus 500 may find, according to a preset matching relationship between the to-be-serialized data and data items, a data item matched with the to-be-serialized data.

In this embodiment, the storage unit 504 in the data storage apparatus 500 may store, based on the data item found by the search unit 503, the data value of the to-be-serialized data into the memory space of the found data item as the data item value of the found data item.

In some optional implementations of this embodiment, the above-mentioned allocation unit is further configured to: generate a storage address according to a file identifier of a file to which the data item belongs, a data element identifier of a data element to which the data item belongs, and the data item name, wherein the above-mentioned storage address points to the memory space allocated to the data item.

In some optional implementations of this embodiment, the above-mentioned search unit is further configured to: determine whether a type of the above-mentioned data value is consistent with the data type of the found data item; determine whether the above-mentioned data value falls within a predetermined data range of the data item value of the found data item, in response to the type of the above-mentioned data value being consistent with the data type of the found data item; and store the above-mentioned data value into the memory space of the found data item as the data item value in response to the above-mentioned data value falling within the above-mentioned data range.

In some optional implementations of this embodiment, the above-mentioned apparatus may further include: an encryption unit (not shown), configured to encrypt the above-mentioned data item value; and a transmission unit (not shown), configured to transmit the encrypted data item value.

In some optional implementations of this embodiment, the above-mentioned apparatus further includes: a setting unit (not shown), configured to set a reading mode identifier for the above-mentioned data item, the reading mode identifier including a mandatory reading identifier or an optional reading identifier, and the reading mode being used for indicating a mode in which a process that receives the transmitted data item value reads the transmitted data item value; the above-mentioned allocation unit is further configured to: allocating the memory space to the data item according to the data type and the reading mode identifier.

Figure 6:
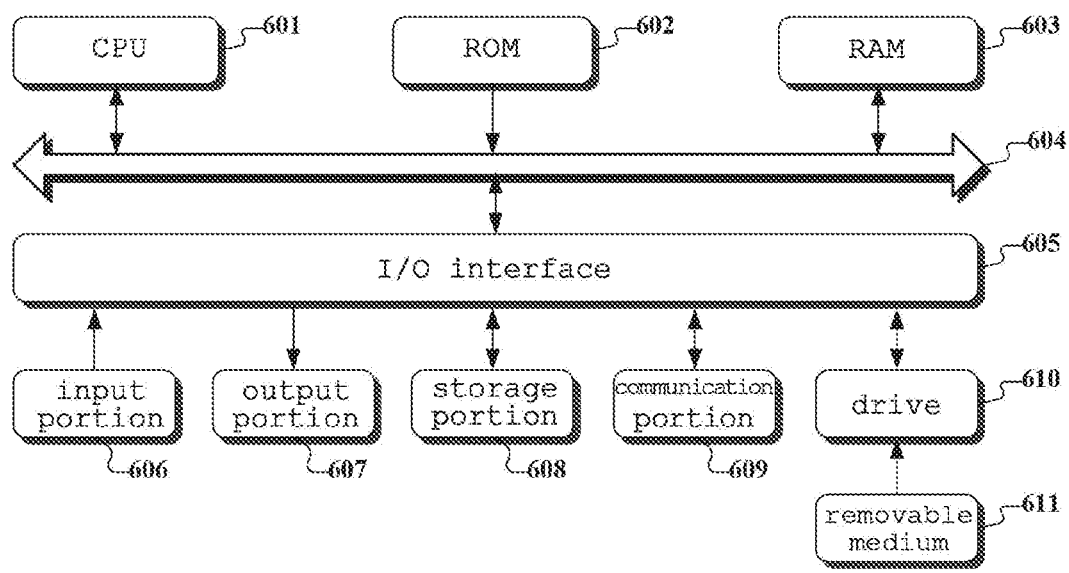
FIG. 6 is a schematic structural diagram of a computer system adapted to implement a server according to an embodiment of the present application.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquiring unit, a allocating unit, a finding unit and a storing unit, where the names of these units or modules are not considered as a limitation to the units or modules. For example, the acquiring unit may also be described as "a unit for acquiring to-be-serialized data and a description file related to the to-be-serialized data".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: acquire to-be-serialized data and a description file related to the to-be-serialized data, the to-be-serialized data comprising a data name and a data value, and the description file comprising a file identifier and at least one data element, the data element comprising at least one data item, and the data item comprising a data item name and a data type; allocate a memory space to the data item according to the data type; find, according to a preset matching relationship between the to-be-serialized data and the data item, a data item matched with the data name; and store the data value into the memory space for the found data item as a data item value of the found data item.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data storage method, comprising:
acquiring to-be-serialized data and a description file related to the to-be-serialized data, the to-be-serialized data comprising a data name and a data value, and the description file comprising a file identifier and at least one data element, the data element comprising at least one data item, and the data item comprising a data item name and a data type, the data type comprising at least one of an integer type, a float type or a character type;
setting a reading mode identifier for the data item, the reading mode identifier comprising a mandatory reading identifier or an optional reading identifier, and the reading mode identifier being used for indicating a mode in which a process that receives a transmitted data item value reads the transmitted data item value;
allocating a memory space to the data item according to the data type and the reading mode identifier, an amount of the memory space occupied by a data item value of the data item when the data item value is stored into the memory space being determined by the data type; wherein if the mandatory reading identifier is set for the data item, the memory space allocated to the data item is consecutive to a memory space of a previous data item for which the mandatory reading identifier is set; if the optional reading identifier is set for the data item, the memory space allocated to the data item is not consecutive to the previously allocated memory space;
finding, according to a preset matching relationship between the to-be-serialized data and the at least one data item of the description file, a data item matched with the data name of the to-be-serialized data; and storing the data value of the to-be-serialized data into the memory space for the found data item of the description file as a data item value of the found data item.

2. The method according to claim 1, wherein the allocating a memory space to the data item according to the data type comprises:
generating a storage address according to a file identifier of a file to which the data item belongs, a data element identifier of a data element to which the data item belongs, and the data item name,
the storage address pointing to the memory space allocated to the data item.

3. The method according to claim 2, wherein the storing the data value into the memory space of the found data item as a data item value of the found data item comprises:
determining whether a type of the data value is consistent with the data type of the found data item;
determining whether the data value falls within a predetermined data range of the data item value of the found data item, in response to the type of the data value being consistent with the data type of the found data item; and
storing the data value into the memory space of the found data item as the data item value in response to the data value falling within the data range.

4. The method according to claim 1, wherein after the data value is stored into the memory space of the found data item as a data item value of the found data item, the method further comprises:
encrypting the data item value; and
transmitting the encrypted data item value.

5. A data storage apparatus, comprising:
at least one processor; and
a memory storing instructions, the instructions when executed by the at least one processor, cause the at least one processor to perform operations, the operations comprising:
acquiring to-be-serialized data and a description file related to the to-be-serialized data, the to-be-serialized data comprising a data name and a data value, and the description file comprising a file identifier and at least one data element, the data element comprising at least one data item, and the data item comprising a data item name and a data type, the data type comprising at least one of: an integer type, a float type or a character type;
setting a reading mode identifier for the data item, the reading mode identifier comprising a mandatory reading identifier or an optional reading identifier, and the reading mode identifier being used for indicating a mode in which a process that receives a transmitted data item value reads the transmitted data item value;
allocating a memory space to the data item according to the data type and the reading mode identifier, an amount of the memory space occupied by a data item value of the data item when the data item value is stored into the memory space being determined by the data type; wherein if the mandatory reading identifier is set for the data item, the memory space allocated to the data item is consecutive to a memory space of a previous data item for which the mandatory reading identifier is set; if the optional reading identifier is set for the data item, the memory space allocated to the data item is not consecutive to the previously allocated memory space;
finding, according to a preset matching relationship between the to-be-serialized data and the at least one data item of the description file, a data item matched with the data name of the to-be-serialized data; and
storing the data value of the to-be-serialized data into the memory space of the found data item of the description file as a data item value of the found data item.

6. The apparatus according to claim 5, wherein the allocating a memory space to the data item according to the data type comprises:
generating a storage address according to a file identifier of a file to which the data item belongs, a data element identifier of a data element to which the data item belongs, and the data item name,
wherein the storage address points to the memory space allocated to the data item.

7. The apparatus according to claim 6, wherein the storing the data value into the memory space of the found data item as a data item value of the found data item comprises:
determining whether a type of the data value is consistent with the data type of the found data item;
determining whether the data value falls within a predetermined data range of the data item value of the found data item, in response to that the type of the data value being consistent with the data type of the found data item; and
storing the data value into the memory space of the found data item as the data item value in response to the data value falling within the data range.

8. The apparatus according to claim 5, wherein after the data value is stored into the memory space of the found data item as a data item value of the found data item, the operations further comprise:
encrypting the data item value; and
transmitting the encrypted data item value.

9. A non-transitory computer storage medium storing a computer program, which when executed by a computer, cause the computer to perform operations, the operations comprising:
acquiring to-be-serialized data and a description file related to the to-be-serialized data, the to-be-serialized data comprising a data name and a data value, and the description file comprising a file identifier and at least one data element, the data element comprising at least one data item, and the data item comprising a data item name and a data type, the data type comprising at least one of: an integer type, a float type or a character type;
setting a reading mode identifier for the data item, the reading mode identifier comprising a mandatory reading identifier or an optional reading identifier, and the reading mode identifier being used for indicating a mode in which a process that receives a transmitted data item value reads the transmitted data item value;
allocating a memory space to the data item according to the data type and the reading mode identifier, an amount of the memory space occupied by a data item value of the data item when the data item value is stored into the memory space being determined by the data type; wherein if the mandatory reading identifier is set for the data item, the memory space allocated to the data item is consecutive to a memory space of a previous data item for which the mandatory reading identifier is set; if the optional reading identifier is set for the data item, the memory space allocated to the data item is not consecutive to the previously allocated memory space;
finding, according to a preset matching relationship between the to-be-serialized data and the at least one data item of the description file, a data item matched with the data name of the to-be-serialized data; and storing the data value of the to-be-serialized data into the memory space for the found data item of the description file as a data item value of the found data item.

10. The non-transitory computer storage medium according to claim 9, wherein the al locating a memory space to the data item according to the data type comprises:
generating a storage address according to a file identifier of a file to which the data item belongs, a data element identifier of a data element to which the data item belongs, and the data item name,
the storage address pointing to the memory space allocated to the data item.

11. The non-transitory computer storage medium according to claim 10, wherein the storing the data value into the memory space of the found data item as a data item value of the found data item comprises:
determining whether a type of the data value is consistent with the data type of the found data item;
determining whether the data value falls within a predetermined data range of the data item value of the found data item, in response to the type of the data value being consistent with the data type of the found data item; and
storing the data value into the memory space of the found data item as the data item value in response to the data value falling within the data range.

12. The non-transitory computer storage medium according to claim 9, wherein after the data value is stored into the memory space of the found data item as a data item value of the found data item, the operations further comprises:
encrypting the data item value; and
transmitting the encrypted data item value.

\* \* \* \* \*